US009929775B2

(12) United States Patent
Sen et al.

(10) Patent No.: US 9,929,775 B2
(45) Date of Patent: Mar. 27, 2018

(54) TECHNIQUES FOR DEVICE-TO-DEVICE COMMUNICATIONS

(71) Applicant: Intel Corporation, Santa Clara, CA (US)

(72) Inventors: Shreyas Sen, Hillsboro, OR (US); Chintan S. Thakkar, Portland, OR (US); Bryan K. Casper, Portland, OR (US); James E. Jaussi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 14/668,199

(22) Filed: Mar. 25, 2015

(65) Prior Publication Data
US 2016/0285513 A1 Sep. 29, 2016

(51) Int. Cl.
H04B 7/00 (2006.01)
H04B 5/00 (2006.01)
(Continued)

(52) U.S. Cl.
CPC ............ H04B 5/0012 (2013.01); H01P 3/16 (2013.01); H01Q 13/24 (2013.01); H04B 5/0031 (2013.01)

(58) Field of Classification Search
CPC ....... H01L 2924/00; H01L 2924/00014; H01L 2224/16225; H01L 2224/32225;
(Continued)

(56) References Cited

U.S. PATENT DOCUMENTS

| 2009/0215394 A1* | 8/2009 | Dewan ................ G06Q 20/202 455/41.2 |
| 2014/0170982 A1* | 6/2014 | McCormack ......... H04W 8/085 455/41.2 |
| 2015/0333724 A1* | 11/2015 | Lahti ..................... H01Q 13/06 343/860 |

FOREIGN PATENT DOCUMENTS

| JP | 2010119003 A | 5/2010 |
| KR | 100780179 B1 | 11/2007 |

(Continued)

OTHER PUBLICATIONS

Jaussi, et al., "Proximity Connector for High-Speed Connections," U.S. Appl. No. 14/286,445, filed May 23, 2014, 44 pages.
International Search Report and Written Opinion dated Jun. 10, 2016 for International Application No. PCT/US2016/019203, 11 pages.

*Primary Examiner* — Golam Sorowar
(74) *Attorney, Agent, or Firm* — Schwabe, Williamson & Wyatt, P.C.

(57) ABSTRACT

Embodiments of the present disclosure provide apparatuses and systems for proximity communications. The apparatus may include an integrated circuit (IC) package with a central processing unit (CPU) circuit, an input-output (I/O) circuit coupled with the CPU circuit, and a dielectric electromagnetic waveguide coupled with the I/O circuit, to enable communications between the CPU circuit and another apparatus. In another instance, the apparatus may include a plurality of coupler pads disposed on a first surface of the apparatus; and a processor electrically coupled with the coupler pads. One of the coupler pads may form capacitive coupling with one of coupler pads disposed on a second surface of another apparatus, in response to a placement of the first surface in at least partial contact with the second surface, to enable proximity data communication between the processor and the other apparatus. Other embodiments may be described and/or claimed.

10 Claims, 8 Drawing Sheets

(51) Int. Cl.
*H01P 3/16* (2006.01)
*H01Q 13/24* (2006.01)

(58) Field of Classification Search
CPC . H01L 2224/49175; H01L 2224/73204; H01L 2924/14; H01L 2224/2919; H01L 2224/48227; H01L 2224/48247; H01L 2924/3025; H01L 2223/6677; H01L 2224/16227; H01Q 1/38; H01Q 1/46; H01Q 1/50; H01Q 13/20; H01Q 13/24; H01Q 1/02; H01Q 1/12; H01Q 1/2266; H01Q 1/2283; H01Q 23/00; H01Q 3/26; H04B 5/0031; H04B 10/038; H04B 2203/5425; H04B 2203/5466; H04B 2203/5491; H04B 3/54; H04B 3/56; H04B 5/0012; H04B 5/0018; H04B 5/0037

See application file for complete search history.

(56) References Cited

FOREIGN PATENT DOCUMENTS

| | | |
|---|---|---|
| KR | 1020120088071 A | 8/2012 |
| KR | 101498636 B1 | 3/2015 |
| WO | 03105079 A1 | 12/2003 |
| WO | 2011056287 A1 | 5/2011 |

\* cited by examiner

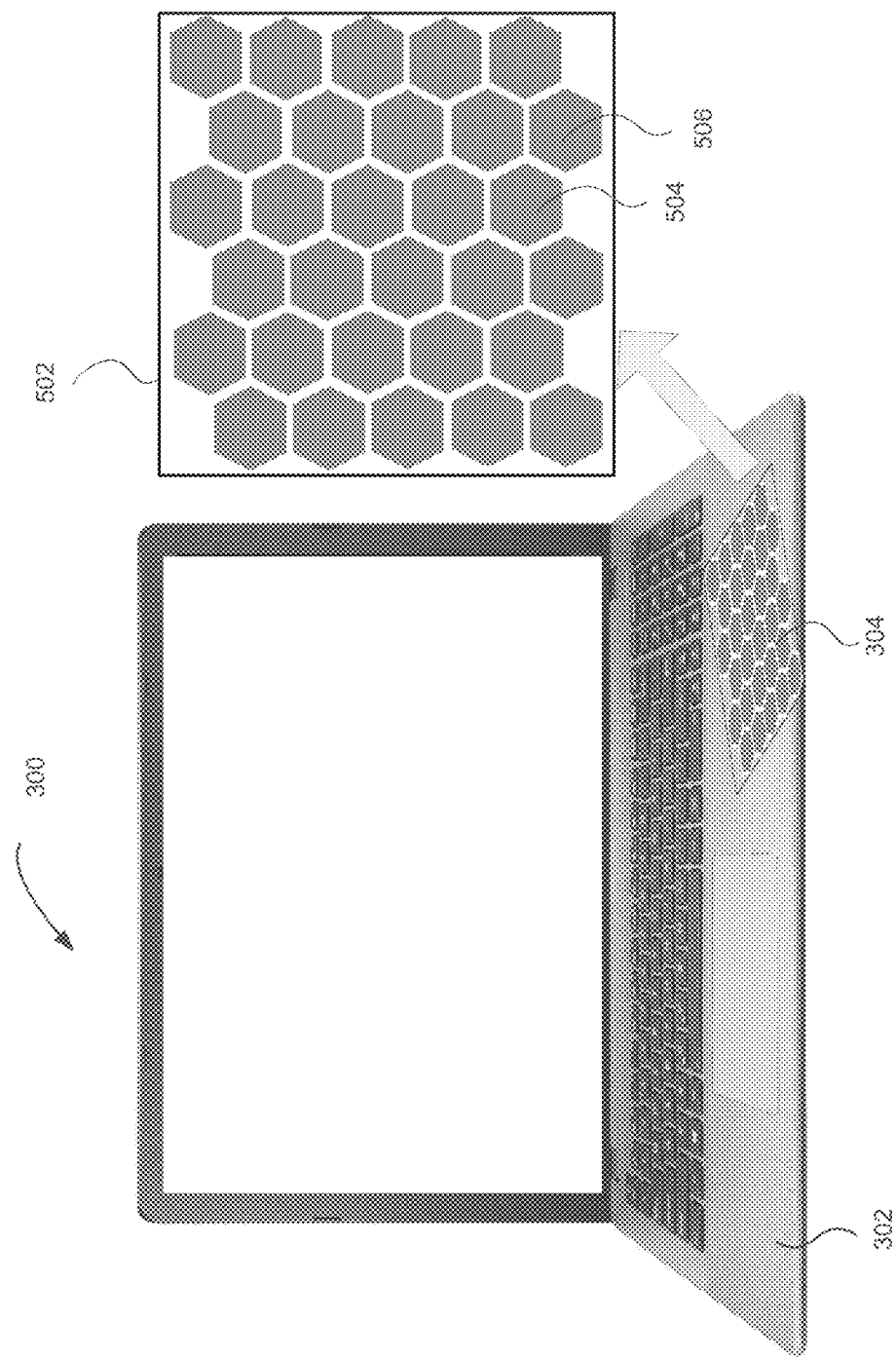

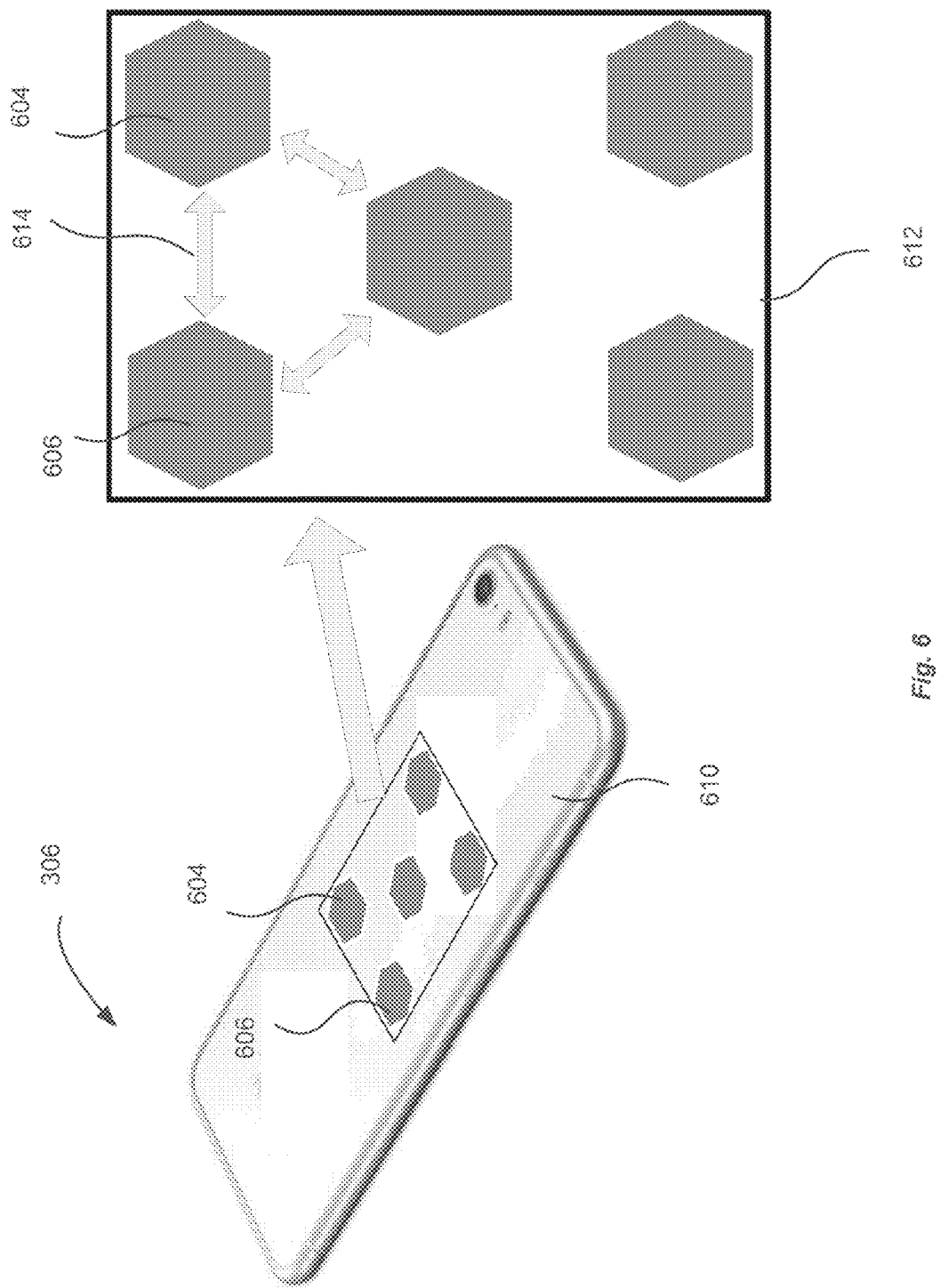

TECHNIQUES FOR DEVICE-TO-DEVICE COMMUNICATIONS

FIELD

Embodiments of the present disclosure generally relate to the field of device-to-device communications, and more particularly, to enabling computing devices with device-to-device communication capabilities via integrating input-output components on a single integrated circuit and/or conductive coupling.

BACKGROUND

Today's computing devices, such as laptop computers, tablets, and smartphones may be equipped with different types of components and connectors for device-to-device communications. Such communications may be wireless or wired, including proximity communications, for example, near-field-based communications.

For wireless device-to-device communications, computing devices may be equipped with various wireless input-output (I/O) components, such as integrated circuits (IC) and antennas. These components may be typically located close to the periphery of the device for better signal transmission and reception. However, such a setup may incur substantial bill of material (BOM) cost because a standalone IC package, a printed circuit board (PCB), power distribution, and control logic for every deployed I/O component may be required. Furthermore, transmission of signals from a processor to the device periphery over conventional media, such as low-cost coaxial cables or PCB micro-strip lines may be prone to frequency-dependent attenuation that may degrade signal integrity, especially for very high-frequency carriers that support high data-rate communication.

A wide range of computing devices may rely on high-bandwidth connectors for wired device-to-device communication. Such connectors may facilitate a connection between a plug of a cable, e.g., a cable from a computing device, and a receptacle, e.g., a receptacle in another computing device. However, because many computing devices comprise small form factor platforms, the connection areas may need to be of limited space, which may or may not be sufficient, for example, to accommodate dimensions of a connector.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 5 illustrates an example device with the coupler pad array disposed on its surface, in accordance with some embodiments.

FIG. 6 illustrates another example device with the coupler pads disposed on its surface, in accordance with some embodiments.

DETAILED DESCRIPTION

Figure 1:
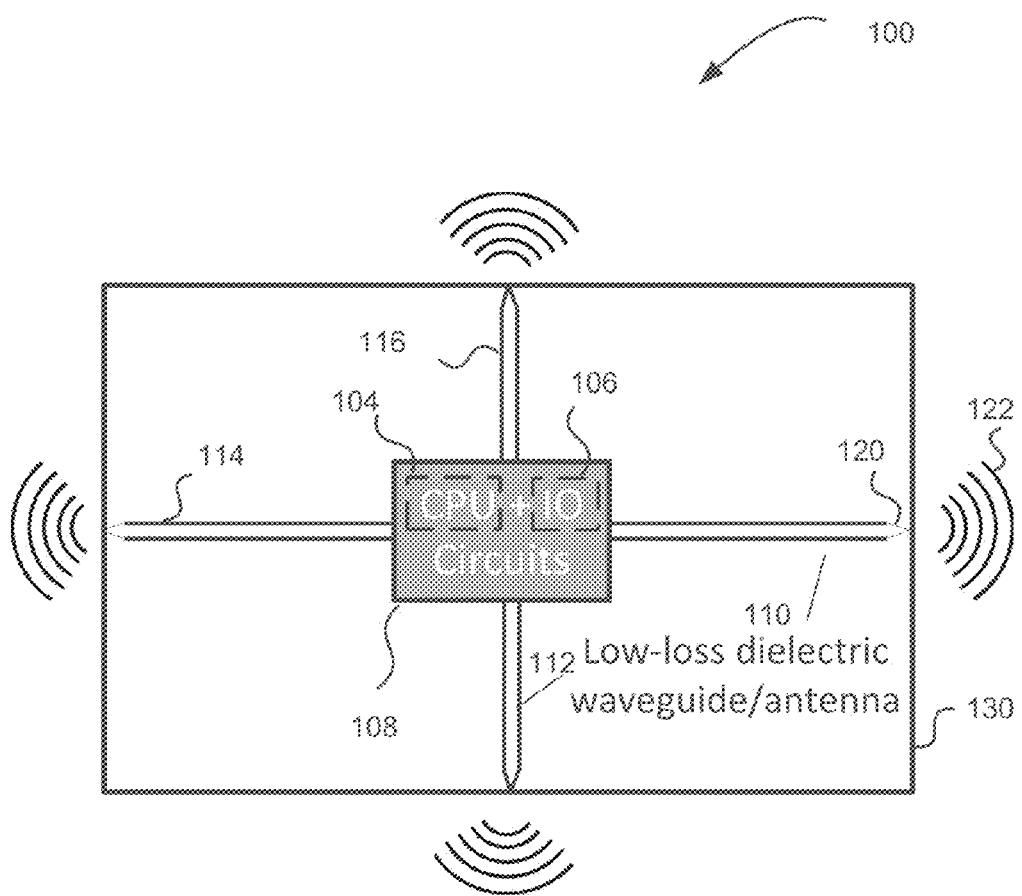
FIG. 1 is a block diagram illustrating an example apparatus with computing and I/O components integrated on one IC package with communicative connection with external devices via a dielectric electromagnetic waveguide, incorporated with the teachings of the present disclosure, in accordance with some embodiments.

Embodiments of the present disclosure include an apparatus for proximity communications, comprising an integrated circuit (IC) package. The IC package may include a central processing unit (CPU) circuit, at least one input-output (I/O) circuit coupled with the CPU circuit, and at least one dielectric electromagnetic waveguide coupled with the I/O circuit, to enable communications between the CPU circuit and other components of the apparatus or another apparatus, via the at least one I/O circuit. In embodiments, the apparatus may comprise a computing device.

Embodiments of the present disclosure further include a system for proximity communications between computing devices. The system may comprise a first surface of a first device, including a plurality of first coupler pads disposed on the first surface to form a coupler pad array. The system may further comprise a second surface of a second device, including one or more second coupler pads. One of the first coupler pads of the coupler pad array of the first device may form capacitive coupling with one of the second coupler pads of the second device, in response to a placement of the first surface in at least partial contact with the second surface, to enable proximity data communication between the first and second devices. In some embodiments the respective coupler pads may include antennas, to enable longer than proximity range wireless data communications between the first and second devices in response to a placement of the devices in proximity to each other, e.g., following the placement of the first surface of the first device in the partial contact with the second surface of the second device.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other.

FIG. 1 is a block diagram illustrating an example apparatus 100 with computing components (circuits) and I/O components (circuits) integrated in one IC package, in accordance with some embodiments. The apparatus 100 may comprise a computing device. For example, the apparatus 100 may comprise a laptop computer, a tablet computer, a smartphone, a netbook, a notebook, an ultrabook, a personal digital assistant (PDA), an ultra mobile PC, or any other mobile or stationary computing device.

In accordance with the teachings of the present disclosure, the apparatus 100 may include computing components and I/O components, such as central processing unit (CPU) circuit 104 coupled with one or more I/O circuits 106. The I/O circuits 106 may be implemented, for example, as WiFi communication module, Bluetooth® communication module, cellular communication module, universal serial bus (USB) communication module or other types of communication modules. The CPU circuit 104 and I/O circuits 106 may be consolidated in a chip (IC package, multichip module (MCM) or system in package (SiP)) 108.

To transport signals (e.g., high-frequency and high data-rate) signals from the CPU circuit 104 to the periphery (e.g., physical side or edge 130 of the apparatus 100), as well as to transmit signals to or receive signals from the external devices (not shown), a dielectric electromagnetic waveguide may be used as a low-loss conduit. For example, apparatus 100 may include at least one dielectric electromagnetic waveguide 110, 112, 114, and/or 116 coupled with the I/O circuits 106, to enable communications between the CPU circuit 104 and other components of the apparatus (not shown) or another (e.g., external) apparatus, via the I/O circuits 106.

A dielectric electromagnetic waveguide may be made of a low-cost, low-loss, preferably high dielectric constant material (e.g., plastic in some embodiments) and may offer desired bandwidth that may be substantially independent of communication distance. The dielectric electromagnetic waveguide 110 (112, 114, 116) may be configured to transmit and receive communication signals (indicated by numeral 122) to or from external apparatuses (e.g., computing devices), by using a tapered structure. For example, dielectric electromagnetic waveguide 110 (and other waveguides 112, 114, 116 shown in FIG. 1 for illustration purposes) may comprise a tapered end 120 to form an antenna, to facilitate communications between the CPU circuit 104 and other (e.g., external) apparatus. For example, in some embodiments, the waveguide 110 (112, 114, 116) may comprise a material with dielectric constant above 4.

The use of dielectric electromagnetic waveguides, such as 110, 112, 114, 116, may provide low-loss and high bandwidth at low costs, compared to conventional solutions. The use of a dielectric electromagnetic waveguide as a conduit for communication signals (e.g., high-frequency signals) in the apparatus 100 may preclude the need for a high-cost directional transceiver, and reduce power, compared to conventional solutions.

In some instances, the use of dielectric electromagnetic waveguides as a conduit for communication signals in the apparatus 100 may enable the consolidation of transceivers (e.g., ultra-high frequency transceivers) into the central chip, such as IC package 108. Incorporation of such transceivers in the IC package 108 may enable high data-rate and low-latency links, which may be used in a wide array of composable computing applications, such as composable screens (e.g., multiple screens consolidated in one screen (not shown) by an apparatus 100), camera arrays for three-dimensional (3D) imaging, and speaker arrays.

In summary, the integration of the CPU circuit 104 and I/O circuits 106 in the IC package 108 with communications enabled by use of dielectric electromagnetic waveguides may provide for lower BOM cost, compared to conventional solutions, which may use multiple I/O circuits, each of which may have their own IC package and power and control distribution and may be located all over the computing device.

Figure 2:
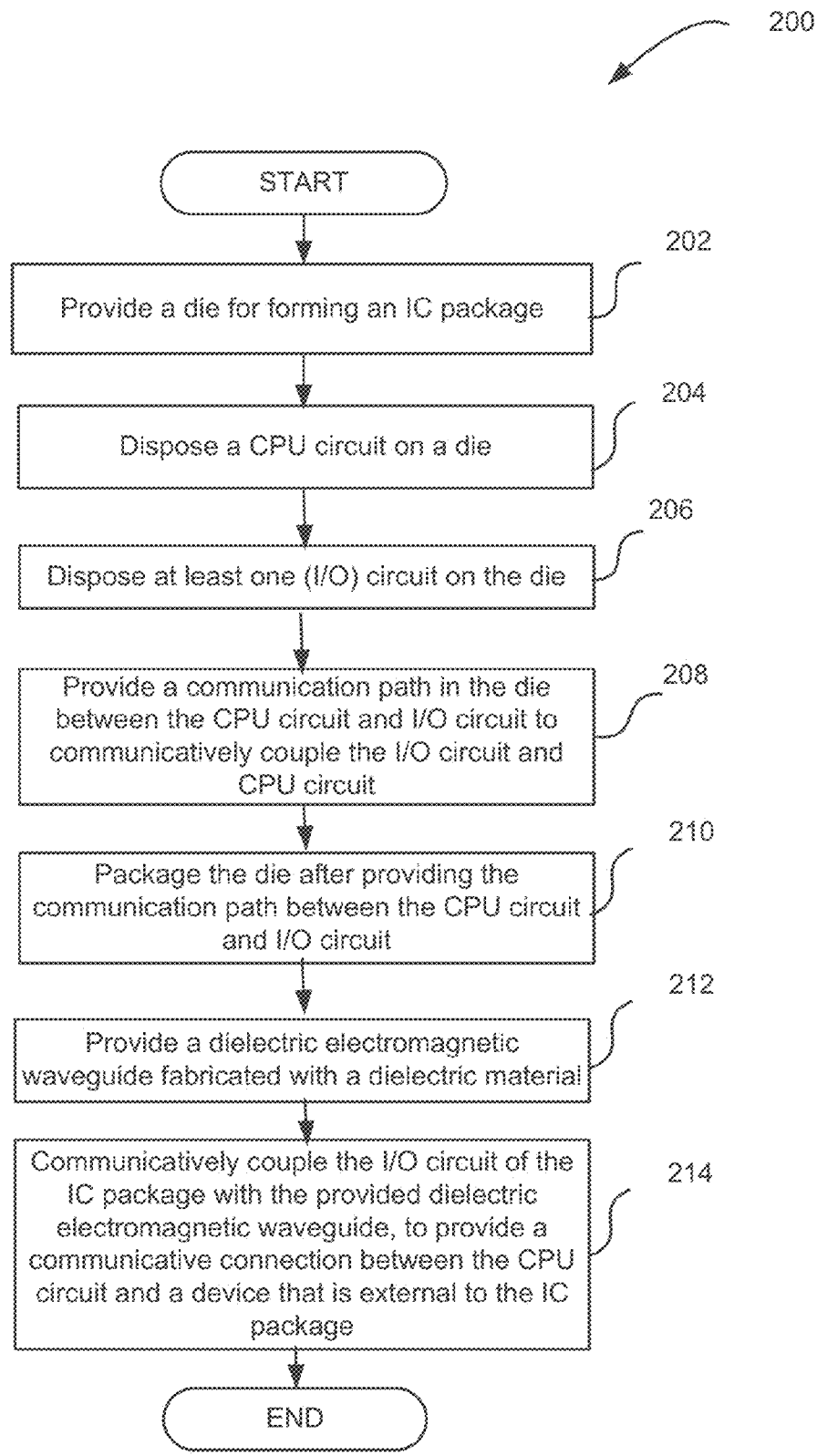
FIG. 2 is a process flow diagram 200 for manufacturing an IC package with consolidated CPU circuit and I/O circuits with communicative connection with external devices via a dielectric electromagnetic waveguide, in accordance with some embodiments.

FIG. 2 is a process flow diagram 200 for manufacturing an IC package with consolidated CPU circuit and I/O circuits with communicative connection with external devices via a dielectric electromagnetic waveguide, in accordance with some embodiments. The process 200 may comport with embodiments described in reference to FIG. 1. In alternate embodiments, the process 200 may be practiced with more or less operations, or different order of the operations.

The process 200 may begin at block 202 and include providing a die for forming an IC package.

At block 204, the process 200 may include disposing a CPU circuit on a die.

At block 206, the process 200 may include disposing at least one (I/O) circuit on the die.

At block 208, the process 200 may include providing a communication path in the die between the CPU circuit and I/O circuit to communicatively couple the I/O circuit with the CPU circuit.

At block 210, the process 200 may include packaging the die after providing the communication path between the CPU circuit and I/O circuit, to form the IC package. The CPU circuit and I/O circuit may be disposed on the same die, which may save BOM cost. In some embodiments, however, CPU circuit and I/O circuit may be disposed on different dies but same package, which may also provide cost benefits.

At block 212, the process 200 may include providing a dielectric electromagnetic waveguide fabricated with a dielectric material. The provision of the dielectric electromagnetic waveguide may include tapering an end of the dielectric electromagnetic waveguide to form an antenna, to enable signal transmission and reception via the dielectric electromagnetic waveguide. The coupling of the waveguide with the package may be provided by means of on-package coupling structures that may be electrically connected to the die, and aligning the dielectric electromagnetic waveguide to such a coupling structure. Such coupling structure may include an antenna.

At block 214, the process 200 may include communicatively coupling the I/O circuit of the IC package with the provided dielectric electromagnetic waveguide, to provide a communicative connection between the CPU circuit and a device that is external to the IC package.

The embodiments described in reference to FIGS. 1-2 may be used for wireless device-to-device communications, including proximity communications. In some instances (e.g., from security, speed, and signal loss perspective), it may be beneficial to use different types of proximity communications, e.g., in instances when communicating devices may be disposed adjacent to, or in contact with each other. FIGS. 3-9 illustrate example embodiments of devices configured to provide device-to-device proximity communications, in accordance with the teachings of this disclosure.

Figure 4:
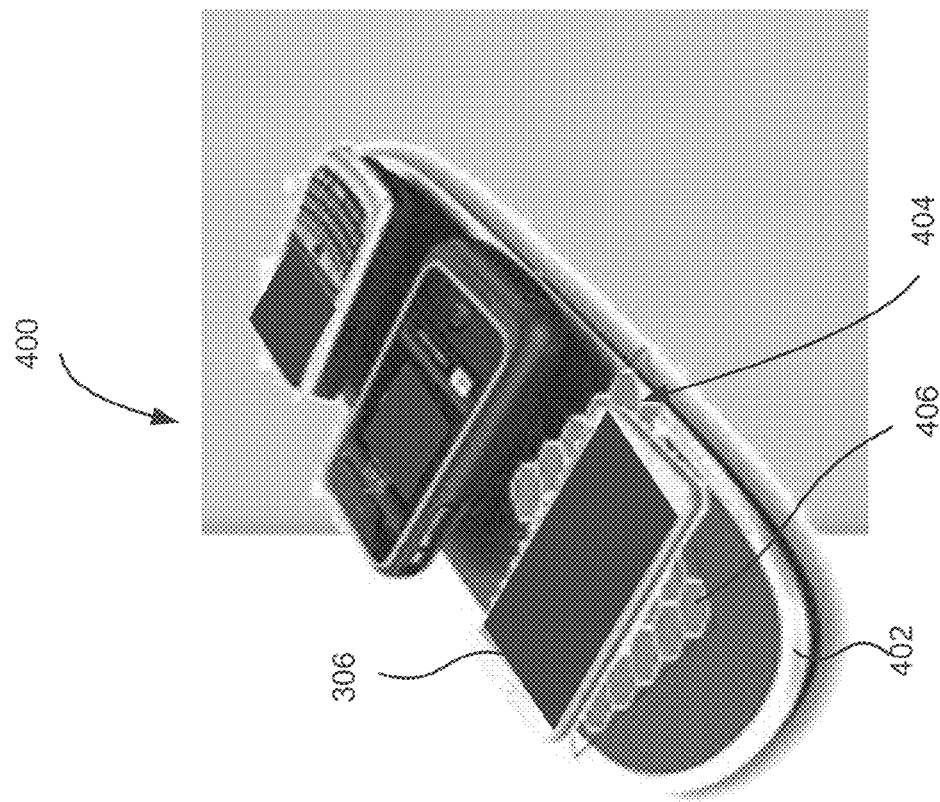
FIGS. 3-4 illustrate some example embodiments of devices configured to enable proximity communications between devices, in accordance with some embodiments.
Figure 3:
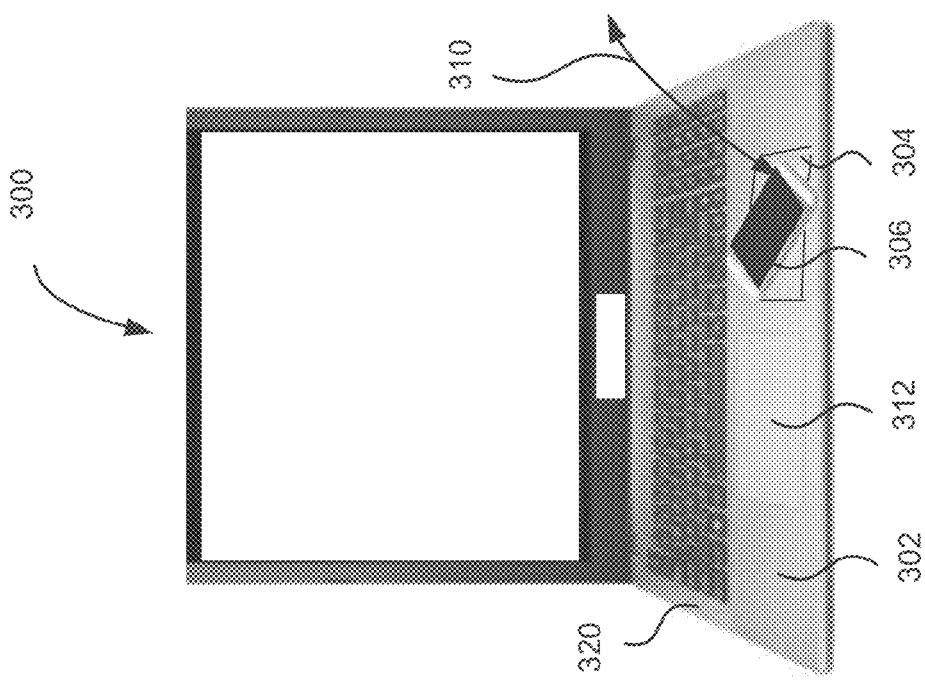

FIGS. 3-4 illustrate some example embodiments of devices configured to enable proximity communications between devices, in accordance with some embodiments. FIG. 3 illustrates an example device, such as a laptop computer 300 having a surface 302, on which a coupler pad array 304 comprising a plurality of coupler pads (described below in greater detail) may be disposed. The coupler pad array 304 may be disposed in an available area on the surface 302 of a device such as laptop 300. In the example illustrated in FIG. 3, the coupler pad array 304 is shown as disposed beside the mouse pad 312. In some embodiments, the coupler pad array 304 may be hidden, e.g., disposed underneath the surface 302. For example, in the example illustrated in FIG. 3, the coupler pad array may be disposed on an inner side (not shown) of the surface 302 comprising the keyboard 320 of the laptop 300.

Another device (e.g., smartphone 306) may be placed 310, at least partially, on the coupler pad array 304 of the laptop 300. In response to the placement, capacitive coupling between the coupler pad array 304 and a mating coupler pad (not shown) disposed on the back of the smartphone 306 may be formed, due to establishment of a direct contact between at least one coupler pad of the array 304 and the mating coupler pad of the smartphone 306. As will be described below, capacitive coupling between the coupler pad array 304 and the mating coupler pad of the smartphone 306 may enable proximity communications between the devices 300 and 306.

FIG. 4 illustrates another example device, such as a charging mat 400 having a surface 402, on which a coupler pad array 404 comprising a plurality of coupler pads 406 may be disposed. Another device (e.g., smartphone 306) may be placed (at least partially) on the array 404 of the charging mat 400. In response to the placement, a direct contact between one of the coupler pads 406 of the array 404 and at least one coupler pad (e.g., mating coupler pad disposed on the back of the smartphone 306, not shown) of the smartphone 306 may be established. In response to the establishment of direct contact, capacitive coupling between the one of the pads 406 of the array 404 and the mating coupler pad may be formed.

The example devices described in reference to FIGS. 3-4 are not limited to the described examples. In general, a first device with a coupler pad array disposed on its surface may be selected from a group including a charging mat, a laptop computer, a docking station, or a detachable notebook, and a second device to be disposed on the coupler pad array of the first device may include a selected one of: a tablet computer, a smartphone, a personal digital assistant, or any other mobile computing device.

The described embodiments enable proximity communications between devices provided by exposed, alignment-free connectivity between the mating coupler pads in response to a placement of a surface with coupler pad array of a first device in at least partial contact with the surface of a second device having at least one coupler pad. The alignment-free connectivity means that one of the first coupler pads of the coupler pad array of the first device may at least (or only) partially overlap with the one of the coupler pads of the second device, to form at least partial contact that may provide capacitive coupling between the respective coupler pads. Accordingly, alignment between the respective coupler pads may be partial, and may not reach 100% in order to provide a desired level of capacitive coupling-based connectivity.

FIG. 5 illustrates the example device (laptop) 300 with the coupler pad array 304 shown in greater detail, in accordance with some embodiments. A fragment of the coupler pad array 304 is shown in an enlarged view 502. As discussed above, the coupler pad array 304 may include a plurality of coupler pads 504, 506. As shown in view 502, the coupler pads 504, 506 may be disposed adjacent to each other, to form the coupler pad array 304. The coupler pads 504, 506 may comprise a shape selected from at least one of: a hexagon (as shown in FIG. 5), a square, a circle, a diamond, a rectangle, or any other shape suitable for forming the coupler pad array 304.

Hexagonal shapes may provide a highest overlap between two coupler pads practically in any orientations. Accordingly, to provide a highest overlap space (and hence highest coupling capacitance) between the respective coupler pads, the coupler pads 504, 506 (and, in some embodiments, the mating coupler pad) may comprise a hexagon shape. The coupler pad array 302 may be reconfigurable (e.g., by reconfiguring the placement of the coupler pads 504, 506 to form different array shapes), to provide the most suitable shape for disposal on a corresponding surface of a device.

FIG. 6 illustrates the example device (smartphone) 306 with the coupler pads disposed on its back surface, in accordance with some embodiments. A placement of the coupler pads 604, 606 on the back surface 610 of the device 306 is shown in an enlarged view 612. As shown, the coupler pads 604, 606 may be placed with a space (e.g., approximately equal the size of the coupler pad or approximately equal the size of the coupler pad plus pitch) or at a determined distance 614 between them, in order to avoid overlap (and resulting cross-talk) between the mating coupler pad of a coupler pad array of another device (e.g., laptop), if placed in contact with the surface 610 of the device 306, and two coupler pads (e.g., 604, 606) placed on the surface 610. It should be noted that the coupler pads 604, 606 may comprise a "sparse" array of coupler pads (e.g., having distances between the coupler pads as described above), while the coupler pad array of another device may comprise an array more fully populated with coupler pads, as described in reference to the coupler pad array 302 of FIG. 5.

In general, one coupler pad (e.g., 604) may be sufficient for communicative coupling between the coupler pad 604 and a mating coupler pad of the coupler pad array of another device. To provide communicative coupling of a desired level, two (e.g., 604, 606) or more coupler pads may be placed on the surface 610 of the device 360. In response to a placement of the array 304 (FIGS. 3, 5) in contact with at least two coupler pads 604, 606 of the device 306, at least two of the coupler pads 604, 606 may at least partially overlap with respective two of the coupler pads 504 of the coupler pad array 304. In this case, one of the devices 300 or 306, e.g., a device initiating a communication between the devices 300 and 306, may determine coupling capacitance values for capacitive couplings provided by the overlaps between the respective coupler pads; and select the capacitive coupling with a highest capacitance value for data communication between the devices 300 and 306.

Figure 7:
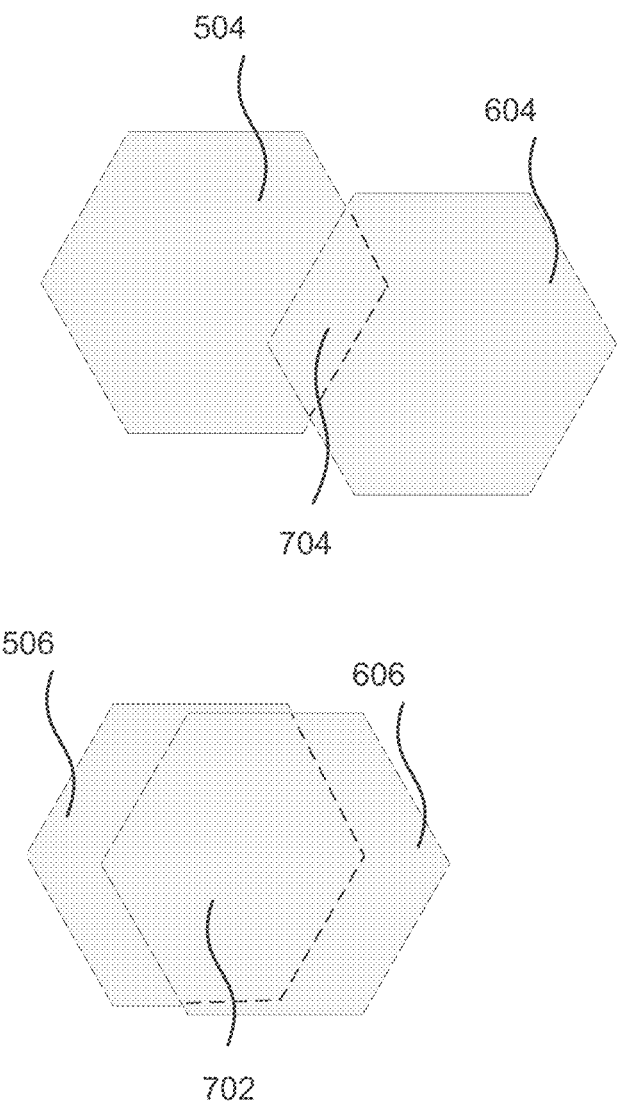
FIG. 7 illustrates example overlapping placements of the coupler pads of respective devices, in accordance with some embodiments.

FIG. 7 illustrates example placements of the respective coupler pads of devices 300 and 306, in accordance with some embodiments. For example, the smartphone 306 may be placed on the pad array 304 of the laptop 300 as shown in FIG. 3. At least two coupler pads 504, 506 of the pad array 304 may overlap with respective two coupler pads 604, 606 placed on the back surface of the smartphone 306, as shown in FIG. 7. The laptop 300 may initiate a selection of the respective coupler pads that may provide capacitive coupling with the highest capacitance. For example, the laptop 300 may send training signals via the communicative connections provided by the capacitive couplings of 504-604 and 506-606, and measure the signal quality at the output. For example, a clock signal may be sent and the received power is measured (e.g., using a power detector) at each coupler pad. The coupler pad with the highest received signal has the highest overlap and may be most beneficial for use for communication. In the illustrated example, the overlap area 702 between coupler pads 506 and 606 is greater than the overlap area 704 between coupler pads 504 and 606. Accordingly, the coupler pad pair 506-606 may be selected for device-to-device communications.

In summary, placing a device (e.g., smartphone or other mobile device) equipped with coupler pad(s) in contact with another device, e.g., on top of a laptop, desktop, detachable notebook, or other computing device equipped with a coupler pad array, may provide high-speed wireline-like proximity communication capabilities using capacitive coupling between respective coupler pads of the devices. An interface formed by capacitive coupling of at least partially overlapping coupler pads may form a connection that may not require exposed connectors, and may provide USB 3.1 like speeds (5-10 Gbps) and energy efficiency through baseband communication. The described embodiments may provide for secure connectivity due to capacitive-coupling character of connectivity, as compared to, for example, wireless connection, which may be picked up by a third party, for example.

The embodiments described in reference to FIGS. 3-7 describe device-to-device capacitive-coupling enabled communications, in response to a placement of the devices such that their respective coupler pads overlap, at least partially, to enable capacitive coupling between the coupler pads. For example, the described embodiments may be implemented when a device may be docked (e.g., to a respective device base) or placed on or next to another device, to provide at least partial direct contact between the respective coupler pads.

The described embodiments may be further enhanced to provide continuous proximity device-to-device communication capabilities. For example, the communications between devices may be maintained when a device is moved from a direct contact with another device (e.g., a docked position) providing communication capabilities due to the capacitive coupling described above) to a position proximate to the other device (e.g., an undocked position). Referencing FIG. 3, smartphone 306 may be initially placed on the coupler pad array 304 to enable capacitive coupling. The smartphone 306 may be subsequently moved away from the coupler pad array 304 (as indicated by arrow 310), e.g., to be placed at a determined distance (e.g., up to 1 m) from the coupler pad array 304. In some embodiments described below, the coupler pad of the smartphone 306 (not shown) and the coupler pad array 304 may be configured to maintain the connectivity between devices that was initiated by capacitive coupling of respective coupler pads in response to the placement pf the smartphone 306 on the coupler pad array 304.

Figure 8:
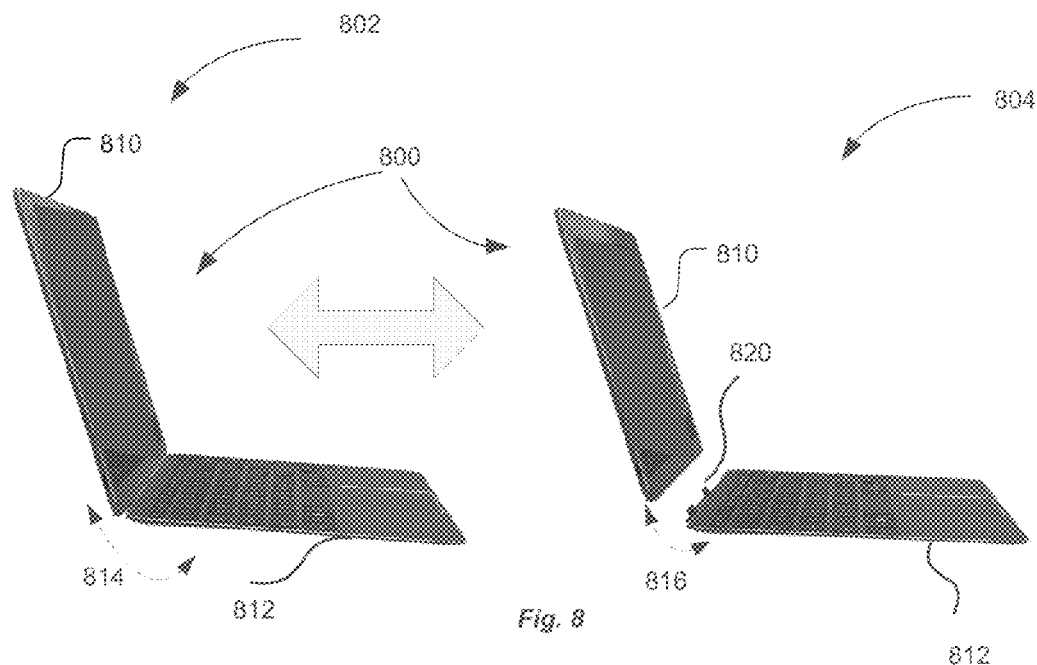
FIG. 8 illustrates an example device, for which the connectivity initiated in the device docked state may be maintained during the device undocked state, in accordance with some embodiments.

FIG. 8 illustrates an example device, for which the connectivity initiated in the device docked state due to capacitive coupling may be maintained during the device undocked state, in accordance with some embodiments. More specifically, FIG. 8 illustrates a detachable notebook 800 in a docked state 802 and undocked state 804. In the docked state 802, the detachable portion 810 may maintain capacitive-coupling enabled connectivity (indicated by numeral 814) with the keyboard portion 812 due to capacitive coupling provided as described above (e.g., in reference to FIGS. 5-7). For example, the capacitive coupling may be provided by one or more coupler pads placed at the detachable portion (not shown) and one or more coupler pads 820 placed on the keyboard portion 812, to match the coupler pads of the detachable portion 812 in the docked state of the notebook 800. As described above, the coupler pads may be configured to partially or fully overlap to provide the capacitive-coupling enabled connectivity between portions 810 and 812. In the undocked state 804, connectivity 816 between portions 810 and 812 of the detachable notebook 800 may be maintained through a wireless connection described in reference to FIG. 9.

Figure 9:
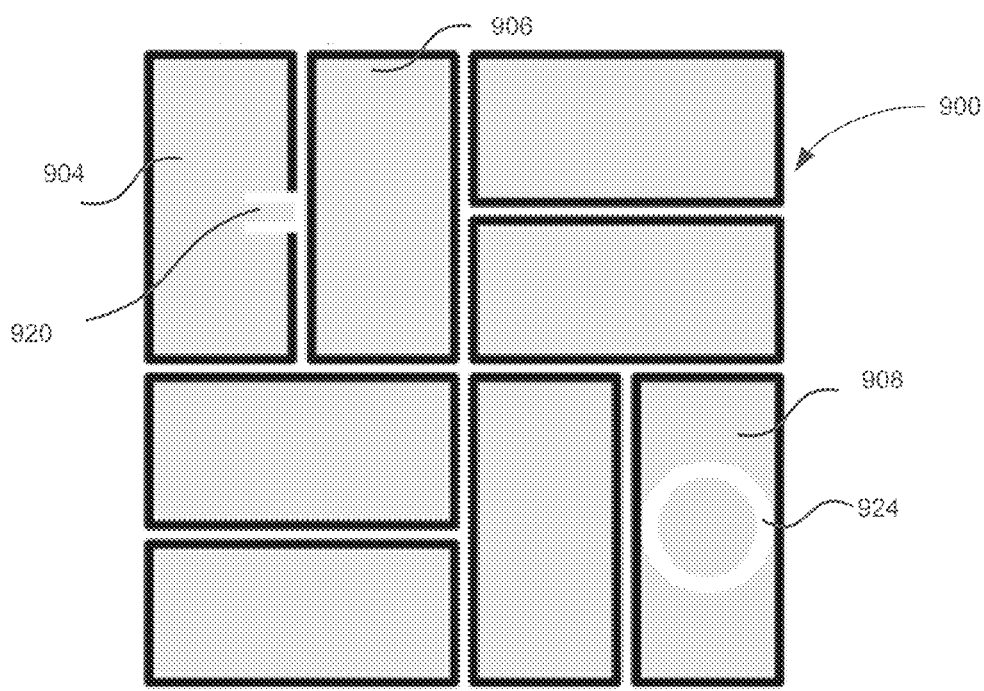
FIG. 9 illustrates an example proximity connector configured to provide wireless connectivity for device-to-device communications, in accordance with some embodiments.

FIG. 9 illustrates an example proximity connector, such as a coupler pad array, configured to provide wireless connectivity for device-to-device communications, in accordance with some embodiments. As shown, a proximity connector (coupler pad array) 900 may be formed by the respective coupler pads 904, 906, 908. The coupler pad array 900 is shown as having eight coupler pads for illustration purposes. For example, the coupler pad array 900 may comprise a four-channel differential proximity coupler. As discussed above, a number of coupler pads in a coupler pad array as well as their sizes and shapes may vary (see, e.g., FIGS. 6-7).

In some embodiments, one or more of the coupler pads 904, 906, 908 (e.g., metal plates) of the coupler pad array 900 (as well as associated transceiver) may be configured to communicate as a radio, such as a short range radio. More specifically, the same coupler pads (e.g., any one or more of 904, 906, 908) that are used for capacitive coupling may be modified to include antennas for a short-range wireless connectivity. For example, when portion 810 is undocked from portion 812 of the device 800, the proximity capacitive coupled link formed by the coupler pads may transform into a wireless link that may provide wireless connectivity (e.g., short range connectivity for a range of 1 cm to 1 m).

More specifically, one or more of the coupler pads may be configured to include an antenna, to enable wireless connectivity between devices. In an example shown in FIG. 9, the coupler pad 904 (in this example, a rectangular metal capacitor plate) may be configured as a patch antenna, having a transmission line 920. Thus, the coupler pad 904 may be configured to provide capacitive coupling in response to partial overlap with a mating coupler pad (e.g. of another device), and provide wireless coupling in response to removal of the mating coupler pad, which also has an antenna capability.

In another example shown in FIG. 9, the coupler pad 908 may be configured as a slot antenna, having a slot 924 that may be built into the metal plate comprising the pad 908.

Since the slot opening area is small (relative to the size of the metal plate), the degradation in capacitor area (and hence capacitance) may be minimal. Accordingly, the capacitance capability of the coupler pad 908 may not be substantially affected.

The dimensions of the capacitor sizes for small-scale (e.g., mm scale) capacitive coupled communication may allow for building patch or slot antennas for short range communications, thus allowing reuse of the same metal plates. For example, to support a 1.6 mm communication distance in a capacitive coupled link, the proximity connector plate size may be approximately 2.9 mm×6.1 mm. This plate, when used as a patch antenna, may allow a use of a center frequency of about 24.6 GHz. Accordingly, the use of the 22-29 GHz (USA), or 22.625-25.625 GHz (Europe) ultra-wideband (UWB) frequencies may be possible for a small-scale (e.g., cm-scale) device-to-device wireless connectivity.

A combination of capacitive-coupling enabled connectivity and wireless connectivity may provide small-scale (e.g., cm-scale) low-latency device-to-device communication capabilities. Accordingly, devices placed in proximity to each other (e.g. tablets placed side by side on a table) to provide wireless connectivity, and/or placed in direct contact with each other to provide capacitive-coupling enabled connectivity (as described in reference to FIGS. 3-5) may stay continuously connected for a desired communication cycle. Such seamless, continuous connection may enable data synchronization, composable computing, composition of multiple screens (e.g., composition of multiple tablet screens placed side by side to make a bigger display), and the like.

In another example, the described communication capabilities may allow docking of a device for authentication and subsequent use in an undocked state ("sync and go"-type applications). For example, the device may be docked for authentication using the capacitive-coupling connectivity and then placed nearby to have a secure (e.g., authenticated) connectivity using the wireless mode through the proximity coupler pads that may serve as antennas. In another example, the device may be placed near another device (or docking station) and have a wireless connectivity with another device or docking station first, and then docked or put in direct contact with another device, providing for seamless switch to capacitive coupling enabled communication. For example, when two devices come in proximity, proximity detectors (e.g., the same detectors that may have been used for pad selection described in reference to FIG. 7) may be used to switch from wireless communication to proximity (capacitive coupling enabled) communication, and achieve desired high speed.

The described communication capabilities may provide high-speed data transfer at a fraction of power used in conventional solutions. For example, the data rate of about 2-4 Gbps may be provided, which is an order of magnitude more than the date rate of Bluetooth® low-power (BTLE)-enabled communications, and orders of magnitude more energy-efficient (10-20 pJ/b) compared to BTLE or Wi-Fi (several hundreds of pJ/b to nJ/b).

The described examples provide for capacitive coupling and wireless communication using the same coupler pads. For example, the same pads can act as capacitive coupler (using metallic overlap) in near-field (proximity communications) and antenna (using slot or patch antenna) in far-field (wireless communications).

Accordingly, the coupler pads provide for reconfigurability of the coupler pads depending on a type of communication (e.g., proximity or wireless). Further, if the pad is substantially simultaneously fed with both the near-field communication signal (e.g., at low frequency) and the far-field wireless signal (e.g., at high frequency), the pad may work simultaneously as a capacitive coupler and an antenna, thus supporting both types of connections together. In some embodiments, all coupler pads comprising a pad array may include antennas built into them. Accordingly, any pad may act as capacitive coupler or antenna, depending on a type of communication. In some embodiments, only some of the coupler pads may be equipped with antennas. In this case, some of the coupler pads may act as an antenna and others may not.

Figure 10:
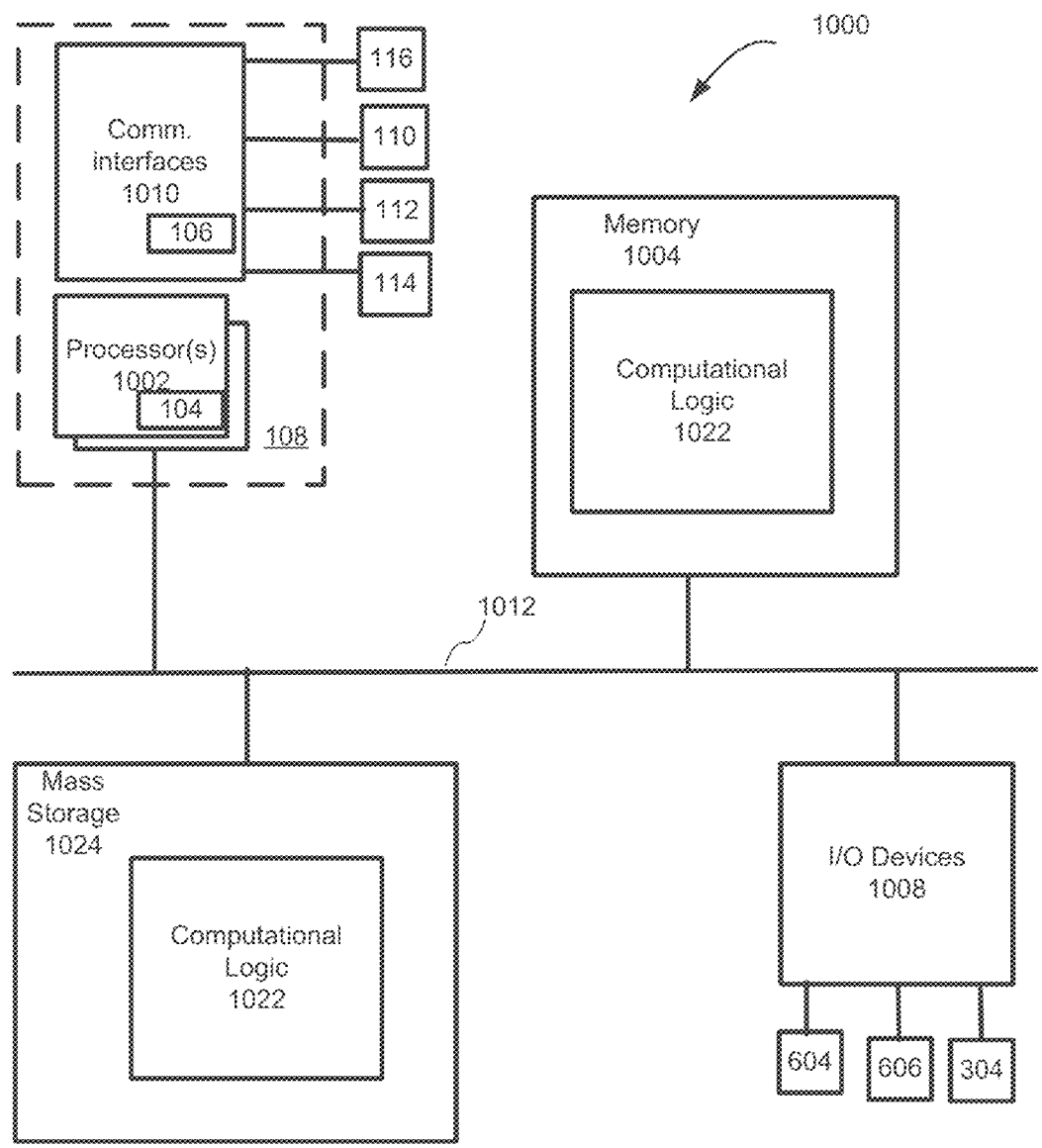
FIG. 10 illustrates an example computing device suitable for use to practice aspects of the present disclosure, in accordance with some embodiments.

FIG. 10 illustrates an example computing device 1000 suitable for use with various components of FIG. 1 and/or FIGS. 3-9, in accordance with some embodiments. In some embodiments, example computing device 1000 may comprise apparatus 100, including various components of apparatus 100 and/or various components described in reference to FIGS. 3-9.

As shown, computing device 1000 may include one or more processors or processor cores 1002 and system memory 1004. For the purpose of this application, including the claims, the terms "processor" and "processor cores" may be considered synonymous, unless the context clearly requires otherwise. The processor 1002 may include any type of processors, such as a central processing unit (CPU), a microprocessor, and the like. The processor 1002 may be implemented as an integrated circuit having multi-cores, e.g., a multi-core microprocessor. In some embodiments, the processor cores may comprise the CPU circuit 104 of FIG. 1.

The computing device 1000 may include mass storage devices 1024 (such as solid state drives, volatile memory (e.g., dynamic random-access memory (DRAM), and so forth)). In general, system memory 1004 and/or mass storage devices 1024 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 1000 may further include input/output (I/O) devices 1008 (such as display 170 of FIG. 1, soft keyboard, touch sensitive screen, image capture device, and so forth) and communication interfaces 1010 (such as network interface cards, modems, infrared receivers, radio receivers (e.g., Near Field Communication (NFC), Bluetooth, WiFi, 4G/5G LTE, and so forth). In some embodiments, I/O devices 1008 may include, or be coupled with, coupler pad array 304 as described in reference to FIG. 3, or one or more coupler pads 604, 606 described in reference to FIG. 6, to enable communicative coupling of the device 1000 with another (external) device (not shown). In some embodiments, the coupler pads 604, 606 and/or coupler pads comprising array 304 may be configured with antennas, similar to the embodiments described in reference to coupler pads 904 and/or 924 of FIG. 9.

The communication interfaces 1010 may include communication chips (not shown) that may be configured to operate the device 1000 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1010 may operate in accordance with other wireless protocols in other embodiments.

In some embodiments, the communication interfaces 1010 may comprise the I/O circuits 106 of FIG. 1. As discussed in reference to FIG. 1, the I/O circuits 106 (e.g., including communication interfaces 1010) and CPU circuit 104 (e.g., processors 1002) may be provided in the central chip (IC package) 108. As shown, at least one dielectric electromagnetic waveguide 110, 112, 114, and/or 116 may be coupled with the I/O circuits 106, to enable communications between the CPU circuit 104 and other components of the apparatus (not shown) or another (e.g., external) apparatus, via the I/O circuits 106.

The above-described computing device 1000 elements may be coupled to each other via system bus 1012, which may represent one or more buses. In the case of multiple buses, they may be bridged by one or more bus bridges (not shown). Each of these elements may perform its conventional functions known in the art. In particular, system memory 1004 and mass storage devices 1024 may be employed to store a working copy and a permanent copy of the programming instructions implementing an operating system, including the operations associated with the apparatus 100 and/or apparatuses described in reference to FIGS. 3-9, collectively denoted as computational logic 1022. Computational logic 1022 may be implemented in assembler instructions supported by processor(s) 1002 or high-level languages that may be compiled into such instructions.

The permanent copy of the programming instructions may be placed into permanent storage devices 1024 in the factory or in the field through, for example, a distribution medium (not shown), such as a compact disc (CD), or through communication interface 1010 (from a distribution server (not shown)). That is, one or more distribution media having an implementation of the agent program may be employed to distribute the agent and to program various computing devices.

The number, capability, and/or capacity of the elements 1008, 1010, 1012 may vary, depending on whether computing device 1000 is used as a stationary computing device, such as a set-top box or desktop computer, or a mobile computing device, such as a tablet computing device, laptop computer, game console, or smartphone. Their constitutions are otherwise known, and accordingly will not be further described.

At least one of processors 1002 may be packaged together with memory having computational logic 1022 (and with communication interfaces 1010) and configured to practice aspects of embodiments described in reference to FIGS. 1-9.

For one embodiment, at least one of processors 1002 may be packaged together with memory having computational logic 1022 to form a System in Package (SiP) or a System on Chip (SoC). For at least one embodiment, the SoC may be utilized in, e.g., but not limited to, a computing device such as a laptop, computing tablet or smartphone.

In various implementations, the computing device 1000 may comprise a laptop, a netbook, a notebook, an ultrabook, a smartphone, a tablet, a personal digital assistant (PDA), an ultra mobile PC, or any other mobile computing device. In further implementations, the computing device 1000 may be any other electronic device that processes data.

The embodiments described herein may be further illustrated by the following examples. Example 1 is an apparatus for communications with another apparatus, comprising: an integrated circuit (IC) package, including: a central processing unit (CPU) circuit and at least one input-output (I/O) circuit coupled with the CPU circuit, and at least one dielectric electromagnetic waveguide coupled with the at least one I/O circuit, to enable communications between the CPU circuit and other components of the apparatus or another apparatus, via the at least one I/O circuit.

Example 2 may include the subject matter of Example 1, wherein the dielectric electromagnetic waveguide comprises a low-loss dielectric material.

Example 3 may include the subject matter of Example 2, wherein the low-loss dielectric material comprises plastic.

Example 4 may include the subject matter of Example 2, wherein the at least one dielectric electromagnetic waveguide comprises a tapered end to form an antenna, to facilitate communications between the CPU circuit and the other apparatus.

Example 5 may include the subject matter of Example 1, wherein the I/O circuit includes at least one of: a cellular communication module, a universal serial bus (USB) wireless communication module, a WiFi communication module, or Bluetooth communication module.

Example 6 may include the subject matter of any of Examples 1 to 5, wherein the apparatus is a computing device.

Example 7 may include the subject matter of Example 6, wherein the I/O circuit comprises a transceiver, and wherein the other apparatus comprises at least one of: a display screen, a camera, or a speaker.

Example 8 is a method of fabricating an apparatus for communications with another apparatus, comprising: forming an integrated circuit (IC) package, wherein the forming includes disposing a central processing unit (CPU) circuit on a die, disposing at least one input-output (I/O) circuit on the die, and providing a communication path in the die between the CPU circuit and I/O circuit to communicatively couple the I/O circuit with the CPU circuit; and communicatively coupling the I/O circuit of the IC package with an dielectric electromagnetic waveguide, to provide a communicative connection between the CPU circuit and a device that is external to the IC package.

Example 9 may include the subject matter of Example 8, further comprising: packaging the die after providing the communication path between the CPU circuit and I/O circuit, to form the IC package.

Example 10 may include the subject matter of Example 9, further comprising: providing the dielectric electromagnetic waveguide fabricated with a dielectric material, wherein providing the dielectric electromagnetic waveguide includes tapering an end of the dielectric electromagnetic waveguide to form an antenna, to enable signal transmission and reception via the dielectric electromagnetic waveguide.

Example 11 is an apparatus for proximity communications with another apparatus, comprising: a plurality of first coupler pads disposed on a first surface of the apparatus and a processor electrically coupled with the plurality of the first coupler pads, wherein one of the first coupler pads of the apparatus is to form capacitive coupling with one of one or more second coupler pads disposed on a second surface of another apparatus, in response to a placement of the first surface in at least partial contact with the second surface, to enable proximity data communication between the processor and the other apparatus.

Example 12 may include the subject matter of Example 11, wherein each of the first coupler pads is disposed adjacent to each other on the first surface, to form a coupler pad array.

Example 13 may include the subject matter of Example 11, wherein the one of the first coupler pads of the coupler pad array is to at least partially overlap with the one of the second coupler pads, to establish direct contact between the first and second coupler pads and enable capacitive coupling between the first and second coupler pads.

Example 14 may include the subject matter of Example 11, wherein the first coupler pads and second coupler pads comprise a conductive material.

Example 15 may include the subject matter of Example 11, wherein the one or more second coupler pads comprise two or more second coupler pads, wherein the second coupler pads are disposed on the second surface at a determined distance between each other.

Example 16 may include the subject matter of Example 15, wherein at least two of the two or more second coupler pads are to at least partially overlap with respective two of the first coupler pads, wherein the apparatus is to determine coupling capacitance values for capacitive couplings provided by the at least partial overlaps between the first and respective second coupler pads, and select the capacitive coupling with a highest capacitance value for data communication.

Example 17 may include the subject matter of Example 11, wherein the first and second coupler pads comprise a shape selected from at least one of: a hexagon, a square, a circle, a diamond, or a rectangle.

Example 18 may include the subject matter of Example 11, wherein the apparatus comprises a selected one of: a charging mat, a laptop computer, a docking station, or a detachable notebook, wherein the other apparatus comprises a selected one of: a tablet computer or a smartphone.

Example 19 may include the subject matter of any of Examples 11 to 18, wherein the one of the first coupler pads of the coupler pad array of the apparatus is to form a wireless connection with the one of the one or more second coupler pads of the other apparatus, in response to a placement of the second surface in proximity with the first surface, wherein the one of the first coupler pads of the coupler pad array includes an antenna, to enable wireless data communication between the apparatuses.

Example 20 may include the subject matter of Example 19, wherein the one of the one or more second coupler pads includes another antenna, to enable wireless data communication between the apparatuses.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus, comprising:
   an integrated circuit (IC) package, including:
   a central processing unit (CPU) circuit; and
   at least one input-output (I/O) circuit coupled with the CPU circuit; and
   at least one dielectric electromagnetic waveguide coupled with the at least one I/O circuit of the IC package, wherein the at least one dielectric electromagnetic waveguide comprises a tapered end to form an antenna, to enable communications between the CPU circuit and other components of the apparatus or another apparatus via the at least one I/O circuit, to enable signal transmission and reception via the at least one dielectric electromagnetic waveguide, wherein the tapered end of the dielectric electromagnetic waveguide extends substantially to a physical side or edge of the apparatus.

2. The apparatus of claim 1, wherein the at least one dielectric electromagnetic waveguide comprises a low-loss dielectric material.

3. The apparatus of claim 2, wherein the low-loss dielectric material comprises plastic.

4. The apparatus of claim 1, wherein the I/O circuit includes at least one of: a cellular communication module, a universal serial bus (USB) wireless communication module, a WiFi communication module, or Bluetooth communication module.

5. The apparatus of claim 1, wherein the apparatus is a computing device.

6. The apparatus of claim 5, wherein the I/O circuit comprises a transceiver, and wherein the other apparatus comprises at least one of: a display screen, a camera, or a speaker.

7. The apparatus of claim 1, wherein the dielectric electromagnetic waveguide is a first dielectric electromagnetic waveguide, wherein a physical side or edge of the apparatus is a first physical side or edge of the apparatus,
   wherein the antenna is a first antenna, wherein the apparatus further includes a second dielectric electromagnetic waveguide coupled with the at least one I/O circuit of the IC package, wherein the second dielectric electromagnetic waveguide includes a tapered end to form a second antenna, wherein the tapered end of the second dielectric electromagnetic waveguide extends substantially to a second physical side or edge of the apparatus, wherein the second physical side or edge is different than the first physical side or edge of the apparatus.

8. A method, comprising:
   forming an integrated circuit (IC) package, wherein the forming includes:
   disposing a central processing unit (CPU) circuit on a die;
   disposing at least one input-output (I/O) circuit on the die; and providing a communication path in the die between the CPU circuit and I/O circuit to communicatively couple the I/O circuit with the CPU circuit; and communicatively coupling the I/O circuit of the IC package with an dielectric electromagnetic waveguide having a tapered end to form an antenna, to provide a communicative connection between an apparatus that includes the IC package and a device that is external to the IC package, to enable signal transmission and reception via the dielectric electromagnetic waveguide, wherein the tapered end of the dielectric electromagnetic waveguide extends substantially to a physical side or edge of the apparatus.

9. The method of claim 8, further comprising: packaging the die after providing the communication path between the CPU circuit and I/O circuit, to form the IC package.

10. The method of claim 8, further comprising: providing the dielectric electromagnetic waveguide fabricated with a dielectric material, wherein providing the dielectric electromagnetic waveguide includes: tapering an end of the dielectric electromagnetic waveguide to form an antenna; and extending the tapered end of the dielectric electromagnetic waveguide substantially to the physical side or edge of the apparatus.

\* \* \* \* \*